(No Model.) 2 Sheets—Sheet 1.
O. JOHANSEN.
FLAXSEED CLEANING MILL.
No. 571,767. Patented Nov. 24, 1896.
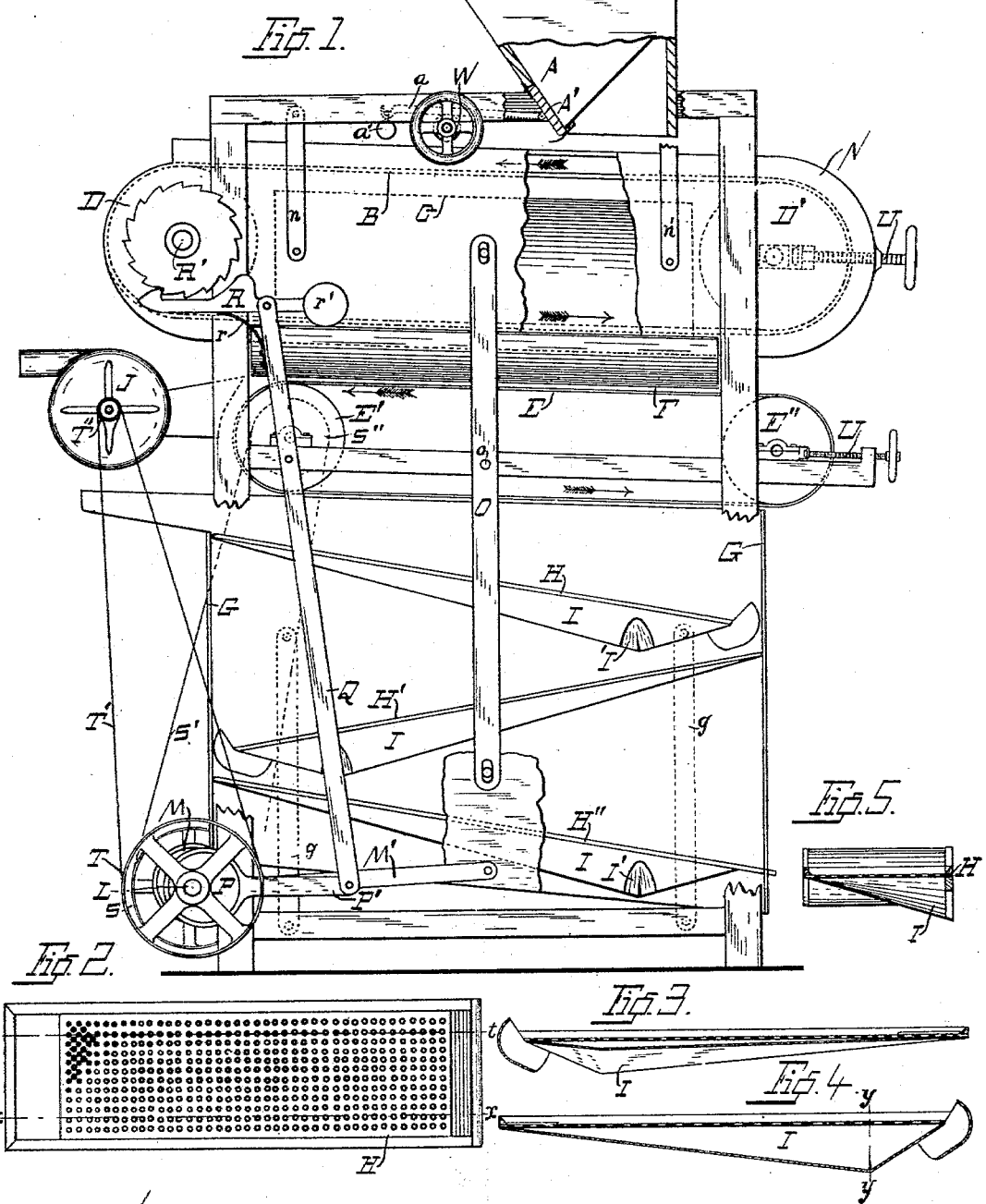

(No Model.) 2 Sheets—Sheet 2.

O. JOHANSEN.
FLAXSEED CLEANING MILL.

No. 571,767. Patented Nov. 24, 1896.

Witnesses:
Ferd. K. Otto.
Winifred Tumlin.

Inventor
Olaus Johansen
By Erwin Wheeler & Wheeler
Attorneys.

UNITED STATES PATENT OFFICE.

OLAUS JOHANSEN, OF RACINE, WISCONSIN.

FLAXSEED-CLEANING MILL.

SPECIFICATION forming part of Letters Patent No. 571,767, dated November 24, 1896.

Application filed December 12, 1895. Serial No. 571,860. (No model.)

*To all whom it may concern:*

Be it known that I, OLAUS JOHANSEN, a citizen of the United States, residing at Racine, in the county of Racine and State of Wisconsin, have invented new and useful Improvements in Flaxseed-Cleaning Mills, of which the following is a specification.

My invention relates to improvements in cleaning-mills, and is designed especially for the purpose of cleaning flaxseed.

It is well known that the ordinary fanning-mill is not suitable for cleaning flaxseed, and is especially inefficient in separating the flaxseed from the seeds of weeds, owing to the lateral vibration of the sieves and the peculiar flattened shape of the flaxseed. It is also well known that the seeds of weeds vary greatly in size and weight and require a more prolonged sifting than is afforded by the mills now in use. For this reason it has heretofore been customary to first run the flaxseed through a fanning-mill to remove the chaff and dust, and then separate it from the weed-seeds by separate sieves operated by hand.

The object of my invention is to provide means for both cleaning the flaxseed and removing the foreign seed in one operation.

In the following description reference is had to the accompanying drawings, in which—

Figure 6:
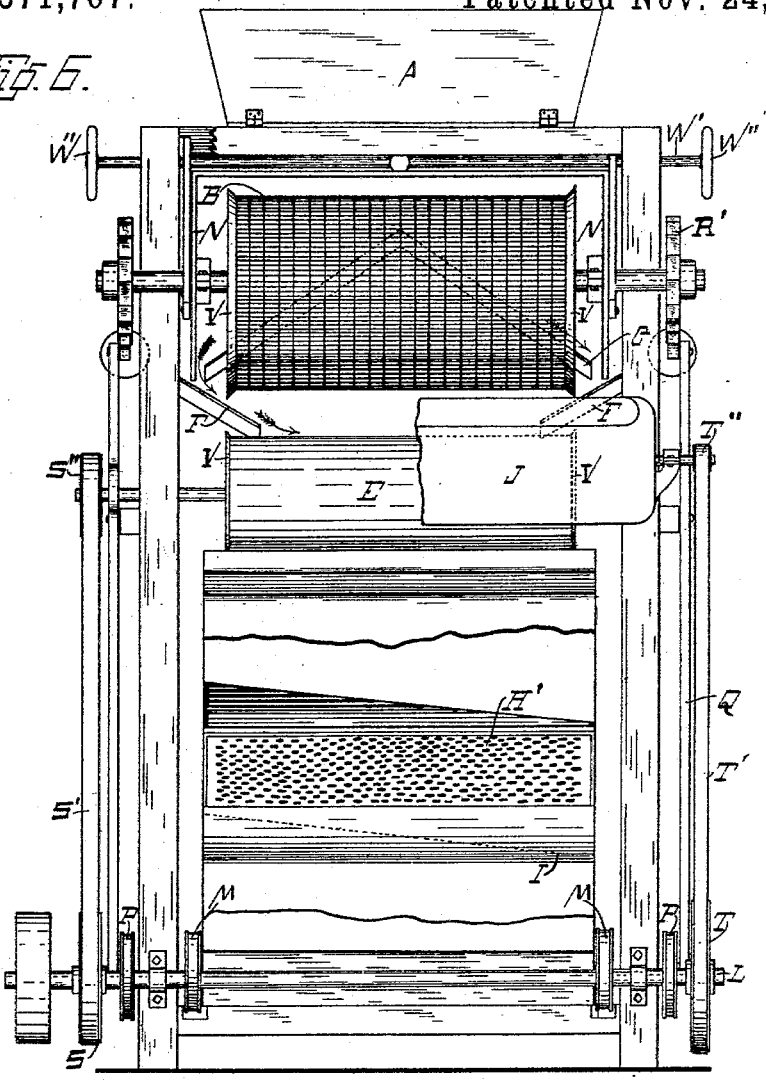
Figure 7:
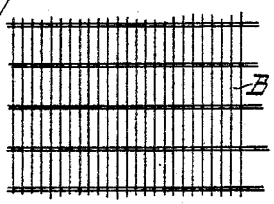
Figure 8:
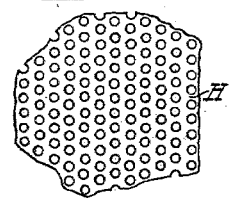

Figure 1 is a side elevation of my cleaning-mill with portions of the inclosing case removed to show the interior construction. Fig. 2 is a top view of one of the lower gang-sieves. Fig. 3 is a side view of the principal section, drawn on line $tt$ of Fig. 2, showing the discharge-opening for the seeds of weeds and other refuse which escapes through the sieve. Fig. 4 is a view of the principal section, drawn on the line X X of Fig. 2. Fig. 5 is a cross-section view drawn on the line Y Y of Fig. 3. Fig. 6 is a front view of the cleaning-mill with a portion of the fan and the shoe or inclosing box in which the gang-sieves are located removed to show the interior construction. Fig. 7 is an enlarged detail view of the belt-sieve. Fig. 8 is a similar view of one of the gang-sieves.

Like parts are identified by the same reference-letters throughout the several views.

The uncleaned seeds are fed through the hopper A upon the vibrating belt-sieve B, the vibratory motion of which causes the flat flaxseeds and small weed-seeds to escape through the narrow elongated openings in the sieve and fall upon the shed C, while the larger weed-seeds, chaff, and other coarse refuse are carried by the movement of the sieve over the roller D to the front of the machine and discharged. The seeds which fall upon the shed C are delivered upon the canvas belt-carrier E by the slides F in an obvious manner and are carried upon the canvas to the front of the machine, where they are delivered into the shoe or vibrating box G, which contains a gang of inclined sieves H, H', and H'', provided with round openings adapted to permit the escape of the weed-seeds and retain the flaxseeds upon the sieves until finally discharged from the lower end of the sieve H'' at the rear of the machine. Each of the gang-sieves is provided with a catch-pan I, preferably formed of sheet metal and inclined laterally and downwardly from the sieve, with a trough-like discharge-opening I', through which the weed-seeds are discharged to the side of the machine. A cylindrical blower J, located immediately in front of the roller K, over which the canvas belt passes, is adapted to create a suction along the front of the roller to draw out the dust and fine chaff from the seeds as they fall from the belt into the shoe, I preferring to use the suction-fan instead of forcing a current of air through the seed on account of the comparatively light weight of the flaxseed.

Motion is communicated to the several parts from the main driving-shaft L, connected with the source of power. The shoe G is supported pivotally upon the bars $g\ g$, and the motion of the shaft is communicated to it through the eccentrics M and arms M', thus causing the shoe to vibrate with a short motion longitudinally of the sieves.

The belt-sieve B is supported upon the rollers D and D' in the vibrating box N, suspended from the top of the frame by the pivoted side bars $n\ n'$, and the motion of the shoe is communicated to the box N through the connecting-levers O, pivotally secured at $o$ to the cross-bars of the frame on each side. A rotary motion is also communicated to the roller D and belt-sieve B through the eccentrics P, arms P', and connecting-levers Q, actuating-pawls R, and ratchet-wheels R', the pawls R being held to the under side of the ratchets by means of springs r and weights r', which may be used together or either may be used separately. Motion is also communicated from the driving-shaft to the canvas belt-carrier E through the pulley S, belt S', pulley S'', and roller E', and to the blower through the pulley T, belt T', and pulley T''.

The bearings of the rear rollers E'' and D' of the carrier and sieve belts respectively are provided with adjusting-screws U, whereby the belts can be kept at a proper tension. The belts are also provided with a flexible strip V on each edge, adapted to keep the seeds from falling off at the sides.

For regulating the feed through the hopper I have provided the hinged drop-lid A' with a rack-bar $a$, mounted upon the cog-wheel W on the rod W' and provided with a weight $a'$ to hold the bar down upon the cogs. The feed can thus be easily adjusted from the side of the machine by means of the hand-wheel W''.

It will be observed that by means of the above-described construction all foreign seeds, such as weed-seeds and the like, which are larger than the flaxseeds, are discharged at once over the roller D, while those of less diameter than the flaxseeds escape through the vibrating gang-sieves. The peculiar flattened shape of the flaxseed renders it highly expedient that the vibration of the sieve should be in the direction of the movement of the flax, as the latter is thereby enabled to escape more readily through the belt-sieve and discharge more rapidly from the gang-sieves.

Having thus described my invention, what I claim as new, and desire to secure by Letters Patent, is—

1. A flaxseed-cleaning mill consisting in the combination of a vibrating and revolving belt-sieve, adapted to permit the passage of the flaxseed therethrough, a hopper adapted to feed the uncleaned seed upon said sieve, sheds or inclines adapted to convey the seed from between the upper and lower halves of said sieve and deliver the same thereunder, a revolving canvas belt conveyer adapted to receive and carry the seed to one side of the machine and drop the same into a vibrating shoe, a suction-fan adapted to remove the chaff and dust from the seed as it is delivered into said shoe, and a gang of inclined sieves located in said shoe and adapted to successively receive the seed and transfer the same longitudinally of each sieve to a suitable discharge-opening at the front of the last sieve, substantially as described.

2. A flaxseed-cleaning mill, consisting in the combination of a vibrating box and a revoluble belt-sieve located therein, rollers for supporting and actuating said belt-sieve, a ratchet-wheel connected with one of said rollers a lever provided with a spring-actuated pawl adapted to engage the teeth of said ratchet-wheel and an eccentric connection between the main driving-shaft and said lever, whereby the motion of said shaft is communicated thereto, together with a gang of vibrating sieves also eccentrically connected with said shaft, and a centrally-pivoted bar connecting said gang of sieves with said vibrating box, substantially as described.

3. A flaxseed-cleaning mill, consisting in the combination of a vibrating and revolving belt-sieve provided with a flexible strip V on each side and adapted to permit the passage of the flaxseed therethrough, a hopper provided with a drop-lid, a weighted rack-bar connected with said hopper, a cross-rod mounted upon the mill-frame and having cogs for engaging the teeth of said rack-bar to actuate said lid, together with a suitable fan for cleaning the dust and chaff from the seed, and a gang of longitudinally-vibrating sieves adapted to receive the seed from said belt-sieve and convey it successively over the several members of the gang to a suitable discharge-opening, substantially as described.

In testimony whereof I affix my signature in the presence of two witnesses.

OLAUS JOHANSEN.

Witnesses:
PETER BERING NELSON,
CARL JOHNSEN.